United States Patent
Ellermann et al.

(10) Patent No.: US 9,847,714 B2
(45) Date of Patent: Dec. 19, 2017

(54) VOLTAGE MULTIPLIER FOR HIGH-CURRENT USE

(71) Applicant: Tesat-Spacecom GmbH & Co. KG, Backnang (DE)

(72) Inventors: Michael Ellermann, Stuttgart (DE); Adolf Nathan, Backnang (DE)

(73) Assignee: Tesat-Spacecom GmbH & Co. KG (DE)

( * ) Notice: Subject to any disclaimer, the term of this patent is extended or adjusted under 35 U.S.C. 154(b) by 0 days.

(21) Appl. No.: 15/188,257

(22) Filed: Jun. 21, 2016

(65) Prior Publication Data
US 2016/0373005 A1 Dec. 22, 2016

(30) Foreign Application Priority Data

Jun. 22, 2015 (DE) .......... 10 2015 007 883

(51) Int. Cl.
*H02M 7/00* (2006.01)
*H02M 3/07* (2006.01)
*H02M 3/158* (2006.01)

(52) U.S. Cl.
CPC ............. *H02M 3/07* (2013.01); *H02M 3/158* (2013.01)

(58) Field of Classification Search
CPC ................................ H02M 3/07; H02M 3/073
See application file for complete search history.

(56) References Cited

U.S. PATENT DOCUMENTS

| | | | |
|---|---|---|---|
| 4,238,714 A * | 12/1980 | Sumi | H03K 4/62 315/399 |
| 4,873,618 A | 10/1989 | Fredrick et al. | |
| 5,436,825 A | 7/1995 | Wawra et al. | |
| 5,598,325 A * | 1/1997 | Pleitz | H02M 3/158 363/132 |
| 6,429,629 B1 | 8/2002 | Nguyen | |
| 7,480,156 B1 | 1/2009 | Wittenbreder, Jr. | |
| 2003/0026112 A1 | 2/2003 | Winick et al. | |
| 2005/0146310 A1 | 7/2005 | Orr | |
| 2013/0070503 A1 | 3/2013 | Appelberg | |

FOREIGN PATENT DOCUMENTS

DE 42 25 335 C1 6/1993

OTHER PUBLICATIONS

German Office Action dated Jan. 18, 2016.

* cited by examiner

*Primary Examiner* — Adolf Berhane
*Assistant Examiner* — Afework Demisse
(74) *Attorney, Agent, or Firm* — Lerner, David, Littenberg, Krumholz & Mentlik, LLP

(57) ABSTRACT

A voltage multiplier includes: a multitude of winding blocks connected in series; a switching circuit configured to connect to ground a first node arranged between a first winding block and a second winding block and a second node arranged between a third winding block and a fourth winding node; a first controlled switch arranged between the first winding block and the second winding block; a second controlled switch arranged between the third winding block and the fourth winding block; wherein each of the first controlled switch and the second controlled switch is configured to be switched in a conductive state or a non-conductive state; wherein the second winding block and the fourth winding block are coupled to an output of the voltage multiplier, such that an output voltage is set at the output depending on the switching state of the switching circuit.

10 Claims, 2 Drawing Sheets

VOLTAGE MULTIPLIER FOR HIGH-CURRENT USE

FIELD OF THE INVENTION

The description relates to a voltage multiplier and a voltage supply for a consumer, particularly for a consumer, which must be supplied with high voltage.

BACKGROUND OF THE INVENTION

Voltage multipliers have a wide range of applications and uses. Basically, they are used where it is necessary to convert a low voltage of an existing voltage supply to a higher voltage for a consumer. Thus, voltage multipliers can be used in satellites for example, which can have a high number of high-voltage components, each of which may require an individually provided high voltage or its own high-voltage value. To this end, a voltage multiplier is provided for each high-voltage component, which multiplies a low voltage on board the satellite to the required high-voltage value.

A voltage multiplier can basically be built such that, starting from an input voltage, two branches are alternately switched to an output. The controlled switches required for this are switched to be conductive or blocking (i.e., non-conductive) by means of a control voltage. It may be necessary here to set the control voltage with reference to a potential of the switches that alternates under certain circumstances, so that the corresponding circuit requires a high complexity for this.

BRIEF SUMMARY OF THE INVENTION

There may be a need for providing a voltage multiplier which is characterized by a less complex control.

A voltage multiplier is described according to one aspect. The voltage multiplier has a plurality of winding blocks connected in series, a switching circuit, a first controlled switch and a second controlled switch. The switching circuit is adapted to switch a first node, which is arranged between a first winding block and a second winding block, and a second node, which is arranged between a third winding block and a fourth winding block, to ground (earth). The first controlled switch is arranged between the first winding block and the second winding block and the second controlled switch is arranged between the third winding block and the fourth winding block. The first controlled switch and the second controlled switch are adapted to be switched into a conductive state or a non-conductive state. The second winding block and the fourth winding block are each coupled to an output of the voltage multiplier, so that an output voltage is set at the output as a function of the switching state of the switching circuit.

By arranging the controlled switches between the first winding block and the second winding block and between the third winding block and the fourth winding block, respectively, the same are referred to ground by means of the switching circuit. That is to say, the switching circuit is connected to the series circuit made up of winding blocks and controlled switches in such a manner that in each case a connector of the switching circuit is electrically connected to an interface of a switch and this interface refers to ground. If reference is made in this description to "ground", then this means an electrical reference potential, i.e. a common potential of the source and consumer voltages. Also in the case of use in satellites which are located in earth orbit, for example, the term "ground" is understood in connection with a voltage multiplier to mean a common potential of the source and consumer voltages. Alternatively, a reference potential for the overall arrangement of satellite and voltage multiplier can be determined, however, the satellite ground can also differ from the ground in the context of the voltage multiplier. With the voltage multiplier as described herein, a control voltage for the control connector of the controlled switches can be adjusted to said reference potential only. By arranging each of the controlled switches between two winding blocks and additionally on a node, to which the switching circuit is connected, an alternating reference potential is not set at the controlled switches and the control voltage does not have to be adjusted to such an alternating reference voltage, so that the complexity of a control circuit can be reduced. It also becomes possible that the voltage supply of the controlled switches, which can be electrically or electronically controlled switches in particular, does not have to be potential-free, as the controlled switches drop only to reference potential as a function of the state of the switching circuit and can be charged in this time by means of a so-called bootstrap diode.

The voltage multiplier can for example be designed as a voltage tripler or multiplier with any desired factor. Any desired multiplication factor, particularly >=2 can be set, depending on how the winding blocks are dimensioned and how many thereof are used. Thus, e.g. on each branch, the number of winding blocks or the transformation ratio between the corresponding controlled switch and the output can be increased. Independently of such an addition of further winding blocks on a branch, the controlled switch stays arranged directly downstream of the first winding block. The two branches are combined at the output of the voltage multiplier.

A winding block is understood as meaning a multiplicity of windings around a core, which have two taps in each case, so that voltages can be tapped or fed in at these taps or so that the controlled switches can be connected at the taps. In one embodiment, all winding blocks are arranged or wound around a common core.

The winding blocks are connected in series, which means that the same are electrically connected in series. Nodes can be located between the winding blocks, by means of which voltages can be tapped or at which further elements, such as e.g. the controlled switches can be integrated into the series circuit of winding blocks. The controlled switches and the winding blocks therefore form a series circuit.

The controlled switches can be switched into one of the two states conductive/non-conductive, i.e. one of these two states is adopted between a first interface and a second interface of a controlled switch. The conductive or non-conductive state can be adopted e.g. as a function of the control voltage applied at a control connector. It is also possible that the controlled switches are self-controlled switches, in which a control connector is used solely for energy supply and in which the conductive state or the non-conductive state is adopted as a function of an environmental variable, wherein the environmental variable can be e.g. a potential value on at least one of the interfaces or a potential difference between the first interface and the second interface or a current value. Furthermore, the switching circuit is switched in such a manner that an interface of a controlled switch is switched to reference potential at a time t. Correspondingly, the output voltage results at the output.

The first controlled switch and the second controlled switch can be rectifier diodes in one embodiment. Optionally, the two controlled switches can have bidirectionally blocking properties. In one embodiment, the two controlled switches can consist of two series-connected field effect transistors (FETs) in each case, wherein the series-connected FETs are connected to each other at their source connectors. In other words, the two FETs of each of a controlled switch are switched contrasting or opposite one another in order to be able to block bidirectionally.

High voltage in connection with this description is understood to mean when a consumer requires a higher voltage than the supplying source voltage, particularly if the source voltage and the consumer voltage are not galvanically separated. The device as described here can be used in a wide range of circuits, e.g. in or with mobile or stationary battery- or mains-operated consumers.

In addition to the switching state of the controlled switches, the output voltage of the voltage multiplier may also be dependent on the design of the winding blocks, such as e.g. the number of windings and further properties of the winding blocks. In any case, the voltage multiplier can be set to a desired output voltage value whilst taking account of these factors.

According to an embodiment, the voltage multiplier has an input voltage connector, which is arranged between the first winding block and the third winding block.

In other words, the input voltage connector forms the source or origin of two branches, which extend to the output of the voltage multiplier over at least two series-connected winding blocks in each case and a controlled switch arranged therebetween. The input voltage connector is adapted to be connected to a source voltage or supplying voltage source, e.g. to a low voltage bus in a satellite.

According to a further embodiment, the voltage multiplier comprises an input filter, which is connected upstream of the input voltage connector, so that interference or high-frequency fluctuations of the input voltage and switching fluctuations of the voltage multiplier in the direction of the voltage source can be filtered out of a voltage curve applied at the input voltage connector.

According to a further embodiment, the voltage multiplier is adapted to multiply a DC voltage.

In particular, the voltage multiplier accepts a low DC voltage and multiplies this to a higher DC voltage. In one embodiment, a pulse voltage or an AC voltage with multiplied voltage value can be generated from a DC voltage. To this end, an RLC element in particular can be adapted or changed at the output of the voltage multiplier in order to provide a corresponding output voltage curve.

According to a further embodiment, the switching circuit of the voltage multiplier comprises two switches, which are adapted to selectively switch the controlled switches to ground one after the other.

This means that the two switches of the switching circuit only switch to let-through one after the other, wherein the switching circuit can preferably be adapted such that a first switch switches to let-through after the passage or lapse of a predetermined time t after the blockage of the second switch. In other words, there is no temporal overlap between the conductive states of the two switches, rather these are even temporally distanced from one another. This is an aspect of the regulation concept of the voltage multiplier and can also be changed in principle.

The time in which the switches of the switching circuit are switched to be conductive, i.e. the controlled switches switch to ground, may be dependent on an output voltage of the voltage multiplier. This is an aspect of the regulation of the voltage multiplier and this time may be correspondingly variable and also may be varied during the operating time of the voltage multiplier. Alternatively or additionally, this time can be set as a function of the output current. A regulating apparatus can be inserted between the two switches and the output of the voltage multiplier, which control apparatus at least takes over the control tasks mentioned here. The regulating apparatus can be adapted in such a manner that the switching state of the switching circuit takes place as a function of the output voltage and/or the output current.

The controlled switches can for example be switched contrasting or opposite to the switches in the switching circuit, i.e. e.g. the controlled switch at a first switch of the switching circuit is not conductive if the first switch is conductive, and is conductive if the first switch is non-conductive. The branch with the second switch of the switching circuit is controlled correspondingly. Temporal overlaps or gaps or both in combination can be included in the state transitions. The controlled switches in the two branches can be switched conductive at the same time if both switches in the switching circuit block at the same time.

According to a further embodiment, each of the first controlled switch and the second controlled switch is a field effect transistor, which can in each case be applied at a control connector with a voltage provided by an energy supply unit, in order to influence the let-through behaviour (forwarding behaviour) of the switches.

The control voltage therefore results in that the field effect transistor changes from the conductive to the non-conductive state or vice versa, depending on the specification of the corresponding component. Depending on the level of the control voltage at the control electrode (also: gate), the field effect transistor is conductive or blocks between drain and source.

According to a further embodiment, the field effect transistors are MOSFETs (metal oxide semiconductor field effect transistors).

In this embodiment, the design of the voltage multiplier makes it possible for the control of the MOSFET driver to be simplified, because only the reference potential (ground, as described above in connection with the ground of the voltage multiplier) has to be taken into account.

The controlled switches can be realised as rectifier diodes in one embodiment. They can be bidirectionally blocking, e.g. as anti-parallel-connected FETs. Therefore, states are possible, in which all switches are in the blocking state at the same time.

According to a further embodiment, the voltage multiplier has a damping element, which is connected between the input voltage connector and the output of the voltage multiplier.

In other words, the damping element can bridge or bypass one or both branches of the voltage multiplier. The damping element is realised to smooth switching overshoots and to output energy that is absorbed during the switch over to the high-voltage phase on a branch, if no voltage is applied temporarily at the output via one of the branches.

According to a further embodiment, the damping element comprises a Z diode and a capacitor connected in series thereto. The capacitor can be connected in the direction of the reference potential "ground" or the direction of the input voltage connector or alternatively in the direction of another stable potential.

A voltage supply for a consumer is provided according to a further aspect. The voltage supply comprises a low-voltage source and a voltage multiplier as described above and in the following. The voltage multiplier is connected at the low-voltage source and adapted to multiply the low voltage and provide the same to the consumer as high voltage at the output.

Two or more voltage multipliers as described here can also be operated in a cascaded circuit, i.e. the output of a first voltage multiplier is electrically connected to the input of a second voltage multiplier, etc. Thus, the multiplication factor can be increased.

BRIEF DESCRIPTION OF THE DRAWINGS

Exemplary embodiments are explained in more detail in the following on the basis of the attached drawings. In the figures.

DETAILED DESCRIPTION

The illustrations in the figures are schematic and not true to scale. If identical reference numbers are used in the following figures, then these relate to identical or similar elements.

Figure 1:
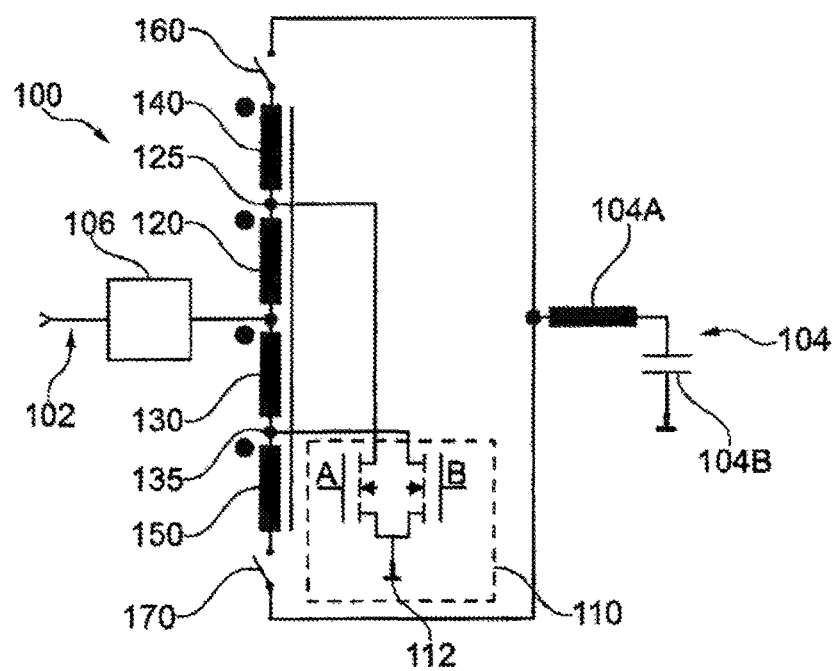
FIG. 1 shows a conventional voltage tripler, which is described for explanatory purposes.

FIG. 1 shows a voltage tripler 100, which is supplied at an input 102 with a low voltage and delivers a multiplied (here: tripled) high voltage at the output 104. An input filter 106 is connected at the input and loops through the input voltage to an input voltage connector 108 of the voltage tripler 100.

At the input voltage connector 108, the voltage tripler 100 branches into two branches, each of which leads to the output 104. The first branch comprises the first winding block 120, the third winding block 140 and the controlled switch 160. The second branch comprises the second winding block 130, the fourth winding block 150 and the controlled switch 170. It can be seen from FIG. 1 that all winding blocks 120, 130, 140, 150 and the controlled switches 160, 170 are connected in series. The voltage multiplication is made possible by means of this design and the switching processes of the controlled switches 160, 170 and of a switching circuit 110.

A switching circuit 110 with two switches A and B is arranged to switch one node 125 between the first and third winding blocks (switch A) and one node 135 between the second and fourth winding blocks (switch B), respectively, to reference potential 112 (ground). Depending on the switching state of the switching circuit and the controlled switches 160, 170, a voltage is applied to the output via different winding blocks.

Depending on the switching states of the switches A and B, the reference potentials of the controlled switches 160 and 170 are not at ground, but rather at a potential differing therefrom, particularly at a potential that is lower than ground. Accordingly, the control voltage must be adapted to this differing potential, which makes the control unit for the controlled switches 160, 170 expensive and complex.

An inductor 104A and a capacitor 104B are connected in series at the output, in order to compensate voltage fluctuations and to deliver a required DC voltage. Alternatively, any desired RLC combinations or else only one or a plurality of elements of a type R, L or C can be connected at the output.

A purely ohmic resistor, for example, makes sense if an AC or pulse voltage is desired at the output.

Figure 2:
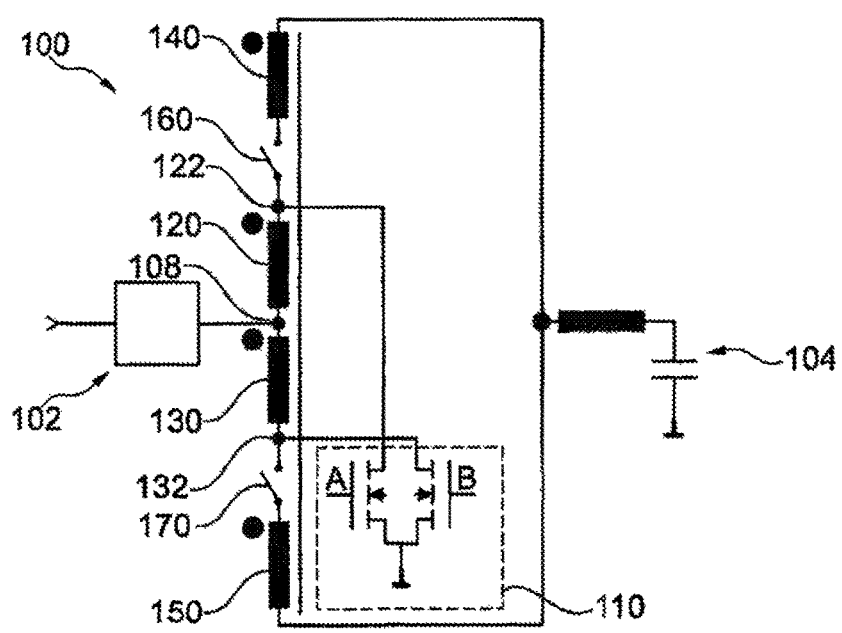
FIG. 2 shows a voltage tripler according to an exemplary embodiment.

FIG. 2 shows a voltage multiplier according to an exemplary embodiment on the basis of a voltage tripler. It may be mentioned that the design as described here can be used for voltage multipliers with any desired multiplication factors, in that e.g. the number and/or the dimensioning of the winding blocks between the controlled switches 160, 170 and the output 104 on each branch is increased. In FIG. 2, the same reference numbers are used as in FIG. 1 in the description of the conventional voltage multiplier. FIG. 1 and the associated description support understanding of the exemplary embodiment in FIG. 2.

In contrast to the conventional voltage tripler in FIG. 1, the controlled switches 160, 170 are arranged between the two winding blocks 120, 140 and 130, 150, respectively. The taps 122, 132 for the switches A, B of the switching circuit are correspondingly located between the first winding block 120 and the controlled switch 160 or between the second winding block 130 and the controlled switch 170. Accordingly, each of these two switches 160, 170 is switched to reference potential 112 if the corresponding switch A, B of the switching circuit 110 switches to let-through. The control voltage for a control connector of the controlled switches 160, 170 can therefore always be provided with reference to the reference potential 112, a potential that differs from that does not arise and does not have to be taken into account.

The switches A and B can be electronically controlled switches, e.g. transistors or thyristors. In any case, it is at least required that the switches A and B can adopt two states, namely conductive and non-conductive. In principal, mechanical switches are also suitable for this, as long as they can achieve the required switching frequency.

Figure 3:
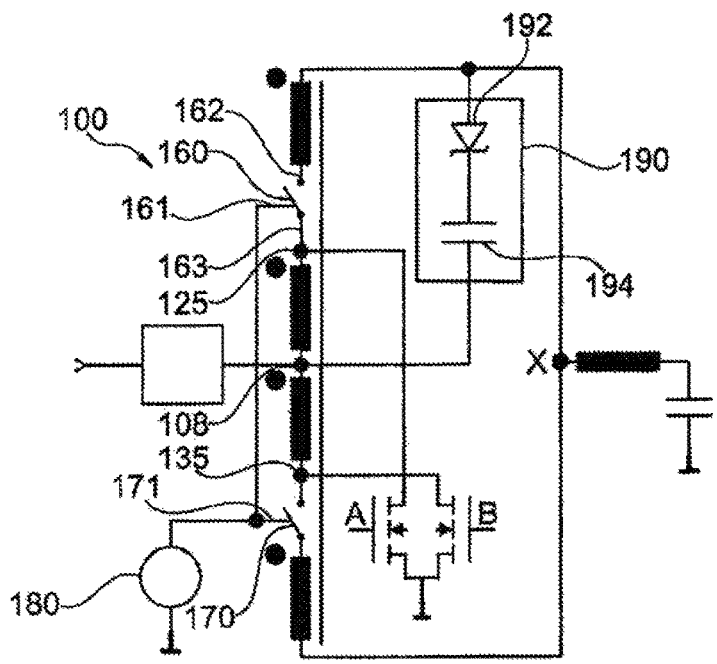
FIG. 3 shows a voltage tripler according to an exemplary embodiment.

FIG. 3 shows a voltage multiplier as in FIG. 2, with the difference that in FIG. 3, an energy supply and control unit 180 for the controlled switches 160, 170 is shown. The control voltage for the controlled switches 160, 170 is looped through from the energy supply 180 to a control connector 161, 171 of the controlled switches, in order to switch the controlled switches to let-through between the interfaces 162 and 163 (or to block).

Furthermore, FIG. 3 shows a damping element (also: snubber), which consists of a series circuit of a Z diode 192 and a capacitor 194 and connects the input voltage connector 108 to the output 104 of the voltage multiplier.

It may be mentioned that any desired RLC elements may be located at the output as a combination of an ohmic resistor, a capacitor and/or an inductor. The output voltage can be smoothed using an LC element. If, by contrast, an output element only with ohmic resistors is used at the output, the voltage multiplier can be used in order to output one or a plurality of voltage pulses, e.g. a series of periodically successive voltage pulses.

A freewheeling diode, or expressed generally, a controlled switch, can be arranged at the output 104. This may be required in particular for example if bidirectionally blocking switches and an inductor are used in the voltage multiplier at the output.

It may be mentioned that an inductor can be arranged between the input voltage connector 108 and the input filter 106, which inductor can limit the input current.

Figure 4:
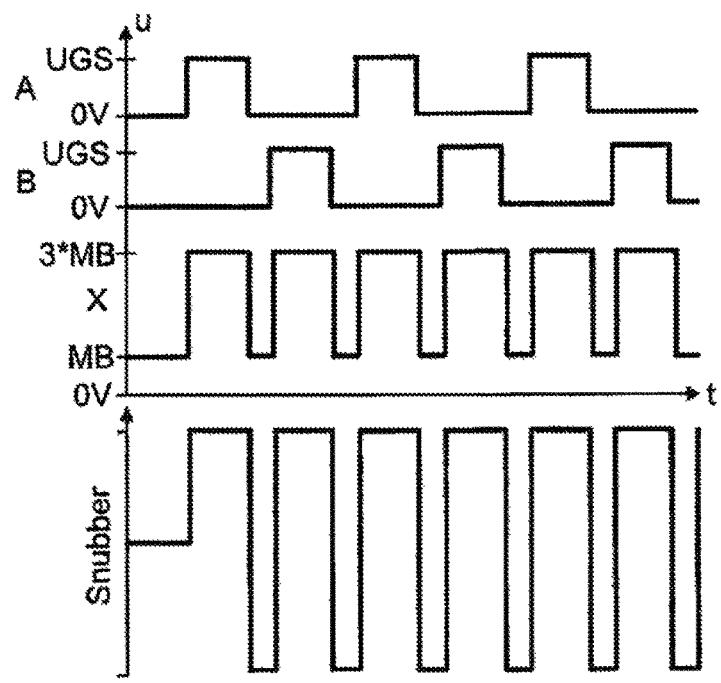
FIG. 4 shows the switching behaviour and an output voltage curve of a voltage tripler according to a further exemplary embodiment.

FIG. 4 shows a comparison of the switching states at the switches A and B of the switching circuit 110 and the voltage level at the output 104 (labelled with X). Furthermore, the charge and discharge state at the damping element 190 is shown.

Switch A is switched (voltage steps from 0 V to UGS), thus the output voltage 3×MB is applied at the output (MB for main bus, voltage value at the low voltage bus at the input of the voltage multiplier). As soon as switch A blocks (voltage drops from UGS to 0 V), the output voltage drops to 0 V. After a fixed time, switch B is switched and the voltage at the output increases again to 3×MB. The voltage at the output increases to 3×MB, irrespective of which switch (A or B) in the switching circuit switches. The voltage curve at X may look different, depending on the actual realisation of the voltage multiplier, e.g. if bidirectionally blocking controlled switches 160, 170 with an ohmic load are used or if a freewheeling diode is used, it may drop to 0 V at the output in the low-voltage phases.

The snubber 190 is charged by switching overshoots during the switch over to high-voltage potential (A or B switches or loops through) and releases the energy when the switching circuit closes the switch A or B. Thus, switching overshoots can be reduced.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

100 Voltage multiplier
102 Input (low voltage)
104 Output (high voltage)
104A Inductor
104B Capacitor
106 Input filter
108 Input voltage connector
110 Switching circuit
112 Ground
120 First winding block
122 Tap
125 Node
130 Second winding block
132 Tap
135 Node
140 Third winding block
150 Fourth winding block
160 Controlled switch
161 Control connector
162 First interface
163 Second interface
170 Controlled switch
171 Control connector
180 Energy supply
190 Damping element

The invention claimed is:
1. A voltage multiplier comprising:
a plurality of winding blocks connected in series;
a switching circuit having a first switch and a second switch and adapted to switch a first node arranged between a first winding block and a second winding block, and a second node arranged between a third winding block and a fourth winding block, to ground;
a first controlled switch arranged between the first winding block and the second winding block forming a series circuit; and
a second controlled switch arranged between the third winding block and the fourth winding block forming a series circuit;
wherein the first controlled switch and the second controlled switch are adapted to be switched into a conductive state or a non-conductive state,
wherein the second winding block and the fourth winding block are coupled to an output of the voltage multiplier, so that an output voltage is set at the output as a function of the switching state of the switching circuit,
wherein, in a conductive state, the first switch of the switching circuit connects the first controlled switch to ground and, in a conductive state, the second switch of the switching circuit connects the second controlled switch to ground, and
wherein a controlled voltage for a control connector of the first and second controlled switches is provided with reference to ground.

2. The voltage multiplier of claim 1, furthermore comprising an input voltage connector arranged between the first winding block and the third winding block.

3. The voltage multiplier of claim 2, further comprising a damping element connected between the input voltage connector and the output of the voltage multiplier.

4. The voltage multiplier of claim 3, wherein the damping element comprises a Z diode and a capacitor connected in series thereto.

5. The voltage multiplier of claim 1, furthermore comprising an input filter connected upstream of the input voltage connector, so that interference is filtered out of a voltage curve applied at the input voltage connector.

6. The voltage multiplier of claim 1, wherein the voltage multiplier is adapted to multiply a DC voltage.

7. The voltage multiplier of claim 1, wherein the first and second switches of the switching circuit are adapted to selectively switch the controlled switches to ground one after the other.

8. The voltage multiplier of claim 1, wherein the first controlled switch and the second controlled switch are field effect transistors, each configured to be applied, at a control connector, with a voltage provided by an energy supply unit, to influence the let-through behaviour of the switches.

9. The voltage multiplier of claim 8, wherein the field effect transistors are MOSFETs.

10. A voltage supply for a consumer, comprising:
a low-voltage source;
a voltage multiplier, the voltage multiplier comprising:
a plurality of winding blocks connected in series;
a switching circuit having a first switch and a second switch and adapted to switch a first node arranged between a first winding block and a second winding block, and a second node arranged between a third winding block and a fourth winding block, to ground;
a first controlled switch arranged between the first winding block and the second winding block to form a series circuit; and a second controlled switch arranged between the third winding block and the fourth winding block to form a series circuit;

wherein the first controlled switch and the second controlled switch are adapted to be switched into a conductive state or a non-conductive state, wherein the second winding block and the fourth winding block are coupled to an output of the voltage multiplier, so that an output voltage is set at the output as a function of the switching state of the switching circuit, wherein the first switch of the switching circuit connects the first controlled switch to ground and the second switch of the switching circuit connects the second controlled switch to ground;

wherein a control voltage for a control connector of the first and second controlled switches is provided with reference to ground, and wherein the voltage multiplier is connected to the low-voltage source and adapted to multiply the low voltage and provide the same to the consumer as high voltage at the output.

* * * * *